(12) United States Patent
Drapela et al.

(10) Patent No.: US 8,118,177 B2
(45) Date of Patent: Feb. 21, 2012

(54) NON-WOVEN WEBS AND METHODS OF MANUFACTURING THE SAME

(75) Inventors: David C. Drapela, Brown Deer, WI (US); William R. Sellars, Milwaukee, WI (US); Thomas C. Shutt, Milwaukee, WI (US); John C. Sellars, Wauwatosa, WI (US)

(73) Assignee: Sellars Absorbent Materials, Inc., Milwaukee, WI (US)

( * ) Notice: Subject to any disclaimer, the term of this patent is extended or adjusted under 35 U.S.C. 154(b) by 433 days.

(21) Appl. No.: 12/317,610

(22) Filed: Dec. 26, 2008

(65) Prior Publication Data

US 2009/0163102 A1 Jun. 25, 2009

Related U.S. Application Data

(63) Continuation-in-part of application No. 11/789,187, filed on Apr. 23, 2007, now abandoned, which is a continuation-in-part of application No. 11/538,746, filed on Oct. 4, 2006.

(51) Int. Cl.
*B01D 24/00* (2006.01)
(52) U.S. Cl. ...... 210/504; 181/286; 181/284; 428/301.4
(58) Field of Classification Search .................. 181/286, 181/284; 428/301.4; 210/504
See application file for complete search history.

(56) References Cited

U.S. PATENT DOCUMENTS

| | | | |
|---|---|---|---|
| 3,047,444 A * | 7/1962 | Harwood | 428/153 |
| 3,232,821 A | 2/1966 | Moore et al. | |
| 3,860,002 A | 1/1975 | Kolbach | |
| 4,000,237 A | 12/1976 | Roberts, Jr. | |
| 4,033,881 A | 7/1977 | Pall | |
| 4,064,599 A | 12/1977 | Neuenschwander | |
| 4,112,192 A | 9/1978 | Vreeland | |

(Continued)

FOREIGN PATENT DOCUMENTS

WO 90/04455 5/1990

(Continued)

OTHER PUBLICATIONS

PCT/US07/79896 International Search Report and Written Opinion, 12 pages, Dated Apr. 2, 2008.

(Continued)

*Primary Examiner* — Forrest M Phillips
(74) *Attorney, Agent, or Firm* — Michael Best & Friedrich LLP (57) ABSTRACT

A product including a web and a method of manufacturing such a product. The product may be for use as an industrial absorbent or a thermal or acoustic insulator and includes a web including scrap and/or recycled cellulose, the cellulose being selected from a source of post-industrial cellulose and/or a source of post-consumer cellulose, the cellulose being treated with a fire-retardant, the cellulose being dry before web formation, and opened, individuated bicomponent fibers mixed with the cellulose, at least some of the bicomponent fibers being thermally bonded to at least some of the cellulose. The method may include shredding the cellulose, declumping and sizing the cellulose, metering the cellulose into a spray booth, applying a fire retardant to the cellulose in the spray booth, if the fire retardant is a liquid, drying the cellulose, adding bicomponent fibers to the cellulose, forming a web, and heating the web in an oven.

20 Claims, 9 Drawing Sheets

U.S. PATENT DOCUMENTS

| | | | |
|---|---|---|---|
| 4,134,948 | A | 1/1979 | Baker, Jr. |
| 4,135,024 | A | 1/1979 | Callahan et al. |
| 4,160,059 | A | 7/1979 | Samejima |
| 4,168,175 | A | 9/1979 | Shutt |
| 4,442,095 | A | 4/1984 | Johnston |
| 4,458,042 | A | 7/1984 | Espy |
| 4,468,336 | A | 8/1984 | Smith |
| 4,587,154 | A | 5/1986 | Hotchkiss et al. |
| 4,590,114 | A | 5/1986 | Holtman |
| 4,595,414 | A | 6/1986 | Shutt |
| 4,600,462 | A | 7/1986 | Watt |
| 4,678,822 | A | 7/1987 | Lewellin |
| 4,780,518 | A | 10/1988 | Ceaser |
| 4,804,695 | A | 2/1989 | Horton |
| 4,822,668 | A | 4/1989 | Tanaka et al. |
| 4,837,067 | A | 6/1989 | Carey, Jr. et al. |
| 4,879,170 | A | 11/1989 | Radwanski et al. |
| 4,929,495 | A | 5/1990 | Stanislawczyk |
| 5,023,131 | A | 6/1991 | Kwok |
| 5,057,168 | A | 10/1991 | Muncrief |
| 5,064,689 | A | 11/1991 | Young, Sr. et al. |
| 5,071,511 | A | 12/1991 | Pittman |
| 5,082,563 | A | 1/1992 | Webb et al. |
| 5,134,179 | A | 7/1992 | Felegi, Jr. et al. |
| 5,167,765 | A * | 12/1992 | Nielsen et al. ............... 162/146 |
| 5,225,242 | A | 7/1993 | Frankosky et al. |
| 5,264,192 | A | 11/1993 | Shutt et al. |
| 5,275,875 | A | 1/1994 | Suh et al. |
| 5,358,607 | A | 10/1994 | Ellis |
| 5,393,599 | A | 2/1995 | Quantrille et al. |
| 5,491,186 | A | 2/1996 | Kean et al. |
| 5,516,580 | A | 5/1996 | Frenette et al. |
| 5,531,890 | A | 7/1996 | Keenan |
| 5,534,301 | A | 7/1996 | Shutt |
| 5,609,667 | A | 3/1997 | Dickerson |
| 5,683,810 | A | 11/1997 | Babbitt et al. |
| 5,786,059 | A | 7/1998 | Frank et al. |
| 5,834,385 | A | 11/1998 | Blaney et al. |
| 5,837,626 | A | 11/1998 | McCullough |
| 5,910,367 | A | 6/1999 | Kean et al. |
| 5,972,039 | A | 10/1999 | Honeycutt et al. |
| 5,981,410 | A * | 11/1999 | Hansen et al. ............... 442/361 |
| 5,993,501 | A | 11/1999 | Cusick et al. |
| 6,025,027 | A | 2/2000 | Shutt |
| 6,109,389 | A | 8/2000 | Hiers et al. |
| 6,139,941 | A | 10/2000 | Jankevics et al. |
| 6,159,882 | A | 12/2000 | Kean et al. |
| 6,171,684 | B1 | 1/2001 | Kahlbaugh et al. |
| 6,177,607 | B1 | 1/2001 | Blaney et al. |
| 6,296,076 | B1 | 10/2001 | Hiers et al. |
| 6,296,737 | B1 | 10/2001 | Wu et al. |
| 6,305,920 | B1 | 10/2001 | Kean et al. |
| 6,475,315 | B1 | 11/2002 | Kean et al. |
| 6,573,204 | B1 | 6/2003 | Philipp et al. |
| 6,583,331 | B1 | 6/2003 | McCormack et al. |
| 6,589,643 | B2 | 7/2003 | Okada et al. |
| 6,635,136 | B2 | 10/2003 | White et al. |
| 6,759,356 | B1 | 7/2004 | Myers |
| 6,784,126 | B2 | 8/2004 | Everhart et al. |
| 6,811,588 | B2 | 11/2004 | Niakin |
| 6,867,154 | B1 | 3/2005 | Lunsford et al. |
| 6,867,156 | B1 | 3/2005 | White et al. |
| 6,872,431 | B2 | 3/2005 | Kahlbaugh et al. |
| 6,986,842 | B2 | 1/2006 | Bortnik et al. |
| 6,989,193 | B2 | 1/2006 | Haile et al. |
| 6,998,164 | B2 | 2/2006 | Neely et al. |
| 7,033,497 | B1 | 4/2006 | Yamaguchi et al. |
| 7,094,270 | B2 | 8/2006 | Schultink et al. |
| RE39,260 | E | 9/2006 | Byrd et al. |
| 7,115,150 | B2 | 10/2006 | Johnson et al. |
| 7,156,953 | B2 | 1/2007 | Tirimacco et al. |
| 7,189,666 | B2 | 3/2007 | Finnegan et al. |
| 7,195,810 | B1 | 3/2007 | Schmidt et al. |
| 7,279,059 | B2 | 10/2007 | Haque |
| 7,878,301 | B2 * | 2/2011 | Gross et al. ............... 181/290 |
| 2002/0028401 | A1 | 3/2002 | Macholdt et al. |
| 2003/0070262 | A1 | 4/2003 | Andersen |
| 2003/0135181 | A1 * | 7/2003 | Chen et al. ............... 604/374 |
| 2004/0097157 | A1 | 5/2004 | Cosentino |
| 2004/0122396 | A1 | 6/2004 | Maldonado et al. |
| 2005/0227566 | A1 | 10/2005 | Bergquist et al. |
| 2005/0281999 | A1 | 12/2005 | Hofmann et al. |
| 2007/0124894 | A1 | 6/2007 | Drapela et al. |
| 2007/0202771 | A1 | 8/2007 | Douglass et al. |
| 2007/0295659 | A1 | 12/2007 | Rygalski et al. |
| 2008/0050565 | A1 | 2/2008 | Gross et al. |
| 2008/0121461 | A1 | 5/2008 | Gross et al. |
| 2008/0233381 | A1 | 9/2008 | Sellars et al. |
| 2008/0254699 | A1 * | 10/2008 | Mio et al. ............... 442/302 |
| 2010/0197183 | A1 * | 8/2010 | Drapela et al. ............... 442/35 |

FOREIGN PATENT DOCUMENTS

| | | |
|---|---|---|
| WO | 97/37757 | 10/1997 |

OTHER PUBLICATIONS

PCT/US07/79908 International Search Report dated Mar. 17, 2008.

German Office Action dated Mar. 25, 2011.

* cited by examiner

NON-WOVEN WEBS AND METHODS OF MANUFACTURING THE SAME

RELATED APPLICATIONS

The present application is a continuation-in-part of prior-filed, co-pending U.S. patent application Ser. No. 11/789,187, filed Apr. 23, 2007, which is a continuation-in-part of prior-filed, co-pending U.S. patent application Ser. No. 11/538,746, filed Oct. 4, 2006. The entire contents of U.S. patent application Ser. Nos. 11/789,187 and 11/538,746 are hereby incorporated by reference.

BACKGROUND

Non-woven fabrics or products are used for a variety of purposes but, in many instances, are used as absorbents. A common paper towel is one example of a non-woven absorbent with known uses such as cleaning and picking up spills. Industrial absorbents are used for similar purposes but are designed for use in industrial environments. For example, non-woven absorbent pads are often used in manufacturing facilities to absorb water, oil, chemicals, and other liquids that may be dispensed, emitted, or leaked from various machines and manufacturing lines.

SUMMARY

Although current industrial absorbents are functional, industrial absorbents with improved characteristics such as, for example, one or more of increased absorbency, lower cost, fire retardancy, etc., would be beneficial. An absorbent produced from relatively inexpensive sources of scrap or recycled cellulose also offers environmental benefits and helps to reduce dependency on non-renewable resources. Most currently available industrial absorbents are made largely from polypropylene, a more expensive and non-renewable resource derived from petroleum.

Thermal and acoustic insulators, currently available in the form of heavy webs or batts, are similarly used in a variety of circumstances. An important use of thermal insulating batts is in residential and commercial building construction, where such batts are installed within ceilings, roofs, and perimeter walls as a means of thermally isolating a building's interior from outdoor temperature conditions. The same or similar insulating materials may be installed within interior building walls as a means of acoustically isolating and/or thermally insulating one interior room from another. Sound dampening webs are also installed in automobile doors and headlines in order to dampen the levels of exterior road noise entering the passenger compartment. Although currently available thermal and acoustic insulating webs are functional, insulators with improved characteristics including, for example, one or more of more effective insulating properties, environmental advantages derived from the use of scrap or recycled cellulose, etc., would be beneficial.

In many instances, cellulose is considered to pose higher fire risks than certain synthetic materials used in currently available industrial absorbents or in currently available thermal or acoustic insulators. However, some embodiments of the invention use cellulose treated with a fire-retardant to ensure that the finished product has a fire retardancy that is equivalent to or better than currently available absorbent or insulating webs.

In one embodiment, a dry-laid web of fire-retardant treated scrap or recycled cellulose may be combined with individuated bicomponent fibers acting as the thermal bonding agent. The constituent cellulose particles of the web vary in size over a wide range, from that of fines (short, individuated fibers) to those with an area equal to that of a ¼" square piece or slightly larger. The finished material is a thermally bonded web of cellulose particles and bicomponent fibers, produced with an amount of compression sufficient to ensure web integrity, without causing an undesirable increase in density. Typically, the web's absorbency and thermal insulating properties vary inversely with its physical density. The amount of bicomponent fiber combined with the cellulose is sufficient to obtain the required web strength (for example, typically 8% to 12% of total web weight, or in another embodiment, 8%-10% of total web weight) but also is limited to allow the web to rebound after thermal bonding or compression processes in order to prevent excessive loss of bulk.

In another embodiment, an absorbent or insulator may include a thermally bonded outer scrim on one surface. The finished product may also include a thermally bonded web of fire-retarded cellulose particles mixed with bicomponent fibers, produced so as to have a lower density (higher bulk) than many currently available competing products. The scrim may be made from at least one thermoplastic material, which during the web bonding process becomes adhered to at least some of the cellulose along one surface of the web and to at least some of the bicomponent fiber along the same surface. The result is a web with greater tensile strength than one without an outer scrim and one with some degree of scuff resistance on the scrim side.

In still another independent embodiment, an absorbent or insulator may comprise a thermoplastic outer scrim on both surfaces of a thermally bonded web of cellulose particles, treated with a fire-retardant and combined with bicomponent fibers. The result is a web with some degree of scuff resistance on both surfaces and greater tensile strength than a similar web with one or no outer scrim.

In yet another embodiment, a web may include a layer of netting material either embedded within or attached to one surface of the web. The absorbent may comprise a thermally bonded web of fire-retarded cellulose particles mixed with bicomponent fibers, produced so as to allow some amount of web material to pass through the open netting during web formation. The netting material thereby may become embedded to some degree within the web during the thermal bonding process. The netting material may also consist of at least one thermoplastic material which bonds to the web material during thermal bonding. The result is a web with greater tensile strength than one with neither netting nor scrim but with no significant changes to surface characteristics.

In another embodiment, a method of manufacturing an absorbent or insulating web may include selecting at least one type of cellulose from a group of sources including post-industrial cellulose, and post-consumer cellulose. The cellulose may be shredded, declumped, and sized (reduced to suitable particle sizes) and then metered into a spray chamber where a liquid fire-retardant may be applied to the cellulose. The method may also include drying the cellulose, combining the cellulose with bicomponent fiber, and then further sizing of the cellulose to a range of particle sizes suitable for web formation. The process of further sizing the cellulose may also help to mix the combination of cellulose and bicomponent fiber.

The processed web material may then be transported pneumatically to one or more storage bins, out of which the material is metered into a forming head. The web material may then be deposited by the forming head in a metered fashion onto a moving, air-permeable forming wire (or belt) to form a web. The means of depositing the web material involves sprinkling the material over a defined area of the forming belt so as to gradually form a web under the influences of gravity and of an air stream flowing down through the web into a suction box positioned beneath the forming belt. The web may then be heated in an oven to cause an outer layer of the bicomponent fiber to melt or soften. The melted or softened outer layer of the bicomponent fiber contacts other fibers and cellulose particles and, when re-hardened or cooled, creates bonds.

If the web is inadequately bonded when it exits the oven, as indicated by, for example, an unacceptably low tensile strength, a tendency to not remain intact when subjected to conditions typical of those for its intended use, etc., the integrity of the web can be improved by, for example, using a higher proportion of bicomponent fiber, increasing the amount of compression on the web either during or after the heating process, and, potentially, using other techniques.

Web compression, achieved by passing the web through a compression nip formed between a belt and a roller or between two rollers, can also be employed to increase web density. For some applications, possibly including those of acoustic insulating webs, the desirable properties of the web may be enhanced by reducing bulk.

If the process includes applying an outer thermoplastic scrim to one or both surfaces of the web, the heating process may cause at least a portion of the thermoplastic scrim to bond with the web. If a scrim is applied to one surface, the scrim may typically be applied to the top of the formed web before entering the oven or heating section. If a second scrim is applied to the bottom surface, then the second scrim is positioned below the forming head such that the web is formed on top of the second scrim.

If a netting material is included in the web, the netting may be positioned below the forming head and at some distance above the forming wire such that a portion of the web material falls through the netting during web formation, thereby embedding the netting to some extent within the web. This enables the bicomponent fibers to bond the netting to the web to provide good surface bonding over the entire surface of the web. Some of the netting is visible on the surface to the naked eye through the fibers, whereas some of the netting is not visible on the surface.

Before any independent features and at least one construction of the invention are explained in detail, it is to be understood that the invention is not limited in its application to the details of construction and the arrangements of the components set forth in the following description or illustrated in the drawings. The invention is capable of other constructions and of being practiced or being carried out in various ways.

Although references may be made below to directions, such as upper, lower, downward, upward, rearward, bottom, front, rear, etc., in describing the drawings, these references are made relative to the drawings (as normally viewed) for convenience. Unless specifically indicated, these directions are not intended to limit the present invention in any form. In addition, terms such as "first" and "second" are used herein for purposes of description and are not, unless specifically stated, intended to indicate or imply relative importance or significance.

DETAILED DESCRIPTION

In one independent embodiment, the invention provides a dry-laid, fire-retarded, thermally bonded web for use as an industrial absorbent, or as a thermal or acoustic insulator. The constituent ingredients of the web generally include particles of scrap or recycled cellulose, bicomponent fiber, and a chemical fire-retardant applied to the cellulose in liquid form by means of a spray system prior to web formation. As discussed in more detail below, the cellulose is dried after being sprayed with a liquid fire-retardant and before being mixed with bicomponent fiber. The cellulose can be obtained from a number of different sources including a source of post-industrial cellulose (for example, scrap from a printing or paper making facility) and a source of post-consumer cellulose (for example, newsprint and similar paper recycled by individuals).

In other independent embodiments, one or more scrim or netting layers are incorporated on or within the produced web. In one form, the scrim is an air-permeable sheet generally made of bicomponent fibers consisting of an inner core of polypropylene and a sheath or outer layer of polyethylene. The individuated bicomponent fibers within the web are generally of the same or similar composition. The outer sheath of polyethylene has a lower melting point than the core of polypropylene. In this form, an outer scrim layer is heated in an oven while in contact with a surface of the web such that melted or softened polyethylene in the bicomponent fibers of the scrim comes in contact with fibers and particles on a surface of the web. As the web and outer scrim layer or layers cool, the polyethylene in the scrim as well as in the individual bicomponent fibers within the web re-hardens to form bonding points with at least some adjacent particles and at least some adjacent fibers.

In another form, a netting configured with approximately 2 to 5 lines (or threads) per inch is made of plastic which does not significantly soften or melt in the heating section and which must be attached to the product by being to some degree embedded within the web. In other forms, the netting may also be made of material which softens or melts to form bonding points with the material of the web. In such constructions, the netting may also be at least partially embedded with the web.

The method of web formation and processing accommodates a wide range of cellulose particle sizes and provides the opportunity to produce a finished web with a relatively high bulk-to-weight ratio of between 20 and 30 mils/osy (thousands of an inch per ounces per square yard). For absorbent webs, a high bulk (low density) helps to achieve a relatively high absorbency of between 11 and 15 times web weight, depending in part on the properties of the absorbed liquid. The cellulose particles in the web can vary in size from that of fines to considerably larger pieces, as can pass through a hammer mill screen with openings typically between 0.2" and 0.3" wide.

A high bulk finished product is achieved by a method that does not require mechanical compression of the unbonded web material in order to form a web. The forming head sprinkles web material onto a steadily advancing forming belt where it forms a web under no more compression force than that resulting from gravity and the downward flow of air through both the web and the forming belt, the air flow being generated by a suction fan, the inlet of which is connected to a suction box positioned beneath the forming belt.

If needed or desired to encourage the formation of bonds between bicomponent fibers and particles of cellulose, some amount of compression may be applied to the web after being heated in the oven, the compression typically being accomplished by means of an adjustable gap between two rollers. The amount of compression applied varies inversely with the size of the gap, which is adjusted on the basis of the desired strength and density of the web.

The strength and density of the web also tend to vary in relation to the amount of individuated bicomponent fibers in the web. In one independent embodiment, the web includes about 8% to 12% of staple bicomponent fibers by total web weight. The bicomponent fibers are crimped and approximately ¼" long. In general, the higher the proportion of bicomponent fiber, the stronger and denser the finished product. However, when the finished product is stronger and denser, the finished product is also less absorbent and less insulating. The remainder of the web includes cellulose particles and fire-retarding chemicals and, in some embodiments, includes one or more layers of scrim or netting.

Figure 1:
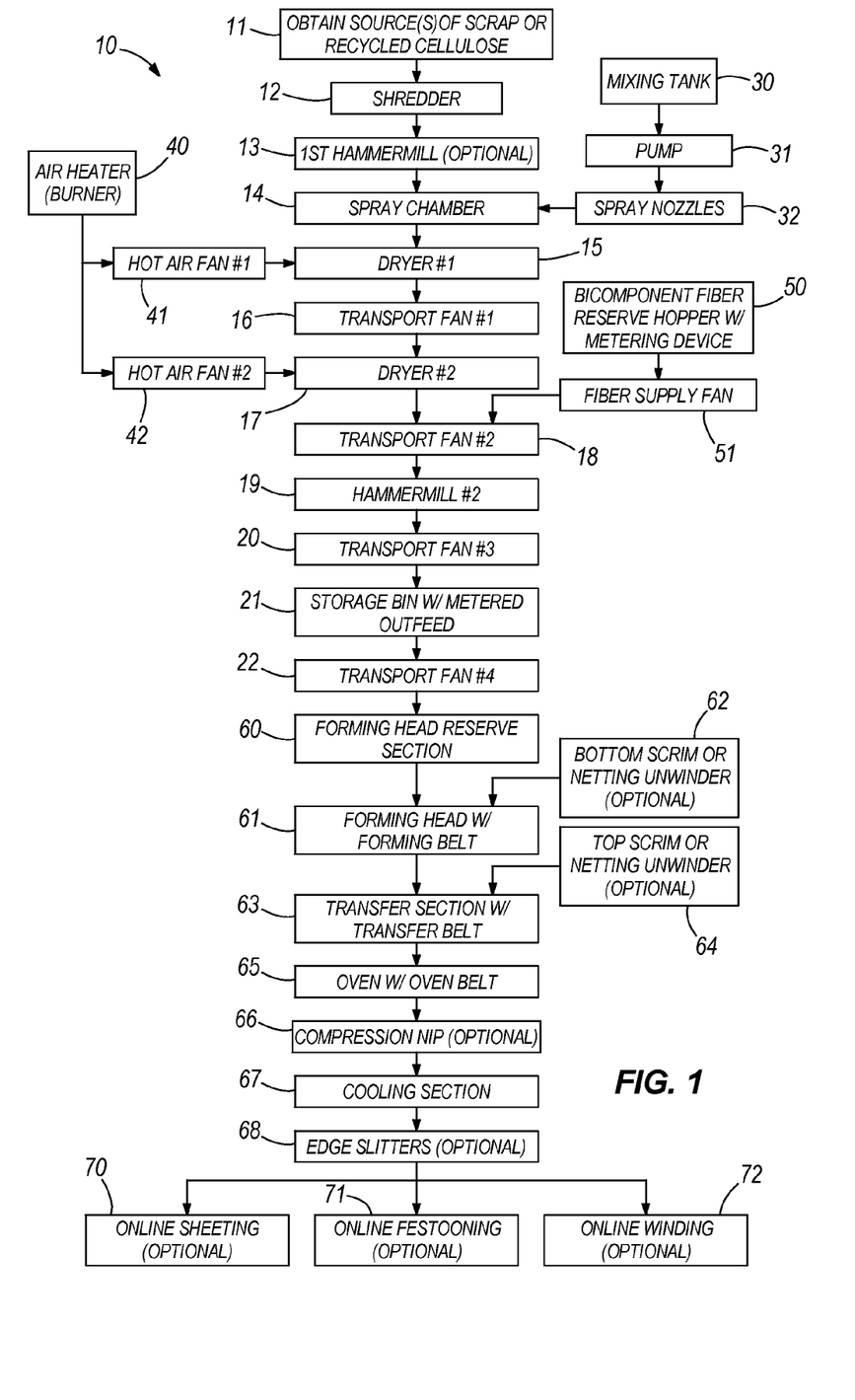
FIG. 1 is a flow chart illustrating the process of manufacturing a product, for use as an absorbent and/or an insulator, including a web.

FIG. 1 illustrates a process 10 for manufacturing a product, for use as an absorbent, filter, insulator, etc., including a web, such as a dry-laid, fire-retarded, thermally bonded web comprised of particles of scrap or recycled cellulose, bicomponent fiber, and fire-retarding chemicals. The process 10 begins at step or block 11 in which cellulose from a variety of sources, including those described above, is obtained. The cellulose is then processed through a shredder (block 12), which, depending on the type of shredder and the properties of the scrap or recycled cellulose, may tend to produce densified or compacted clumps of material.

Before entering the spray chamber (block 14), the shredded pieces of cellulose must be small enough and of low enough density to permit a sufficiently rapid absorption of sprayed liquid fire-retardant, given the desired throughput, the allowable time for absorption, and the desired level of fire-retardancy. If necessary to achieve the suitable range of sizes and densities, the clumps and pieces of cellulose exiting the shredder are processed through a first hammer mill (block 13) which declumps and generally reduces the cellulose to sizes ranging from fines to pieces up to 3" to 4" in length. The first hammer mill is optional in that some types of shredders may reduce the cellulose to non-compacted pieces within a similar size range without requiring further processing.

After exiting the shredder and, optionally, the first hammer mill, the processed cellulose is then pneumatically transported through a series of devices in an air stream generated by the series arrangement of three transport fans: transport fan #1 (block 16), transport fan #2 (block 18), and transport fan #3 (block 20). The transport fans provide a motive force to move the processed cellulose along the series of devices.

The cellulose is drawn by the air stream through a spray chamber (block 14) where it is sprayed with a liquid fire-retardant. One manner of applying fire retardant to the cellulose that may be useful in embodiments of the present invention is described in U.S. Pat. No. 5,534,301, the entire contents of which is hereby incorporated by reference.

In one independent embodiment, the liquid fire-retardant comprises water into which boric acid and ammonium sulfate have been added to just below their respective saturation levels in water at approximately 77 degrees Fahrenheit. The liquid fire-retardant is mixed in a mixing tank (block 30) and then supplied to spray nozzles (block 32) by a volumetric pump (block 31). The spray nozzles are arranged so as to provide sufficient opportunity for cellulose passing through the spray chamber to absorb the desired amount of liquid fire-retardant. Approximately 25 to 40 gallons of fire-retardant are sprayed into the spray chamber for approximately every 1000 lbs. of processed cellulose.

After being sprayed with a liquid fire-retardant, the cellulose is dried by passing through a first drying chamber (block 15), into which hot air fan #1 (block 41) injects heated air generated by an air heater (block 40), such as a gas burner. The spray chamber (block 14) and first dryer (block 15) are arranged so as to allow adequate time for the liquid fire-retardant to be absorbed by the cellulose prior to being subjected to heated air. The heated air injected into dryer #1 (block 15) is limited in temperature and volume to avoid excessively rapid drying of the cellulose, which, if not avoided, may prevent adequate absorption by the cellulose of the fire-retardant chemicals.

The cellulose is then transported in the air stream into a second dryer (block 17). Heated air injected into the second dryer by hot air fan #2 (block 42) from an air heater (block 40) is sufficient to complete the process of driving water out of the cellulose. The dried cellulose exits the second dryer (block 17) and enters transport fan #2 (block 18).

Bicomponent fiber is stored in and metered at a controlled rate from a reserve hopper (block 50) into a fiber supply fan (block 51), which introduces the bicomponent fiber into the inlet of transport fan #2 (block 18). The fire-retardant treated cellulose along with the bicomponent fiber is then transported to the second hammer mill (block 19), in which the cellulose is further reduced in size and mixed with the bicomponent fiber. The mixture of bicomponent fiber and cellulose (the web material) is then carried through transport fan #3 (block 20) to a storage bin (block 21).

The storage bin (block 21) is equipped with a metering mechanism by which processed web material can be fed at a controlled rate into transport air fan #4 (block 22), which carries the material to the forming head chute or reserve section (block 60). The reserve section (block 60), situated on top of the forming head (block 61), meters web material at a controlled rate into the forming head.

The forming head (block 61) disperses and deposits the web material over a defined area of the advancing forming belt (included in block 61) to gradually form the pre-bonded web. A forming head suitable for use in making the web is described in U.S. Patent Publication No. 2007/0124894, the entire contents of which is hereby incorporated by reference.

If included in the embodiment, a bottom layer of scrim is unwound from a first unwinder (block 62) and carried under the forming head on top of the forming belt. The web is then formed on top of the bottom scrim.

If included in the embodiment, a layer of netting is unwound from a first unwinder (block 62) and carried under the forming head, and, for some distance while under the forming head, above the forming belt. Some amount of web material thereby falls through the netting, causing the netting to become to some extent embedded within the web.

If included in the embodiment, a top layer of scrim is unwound from a second unwinder (block 64) and carried on top of the web either while the web is still on the forming belt after the forming head, or while the web transitions from the forming belt (included in block 61) to the transfer belt (included in block 63).

The transfer section (block 63) includes structure for transferring the web from the forming belt to the oven belt (included in block 65).

The web is conveyed from the transfer section (block 63) to the oven (block 65), where it is heated sufficiently to cause the melting or softening of the polyethylene in the individuated bicomponent fibers, and, if provided, in the scrim layer(s). Molten or softened polyethylene in contact with other fibers or particles of cellulose in the web may create bonds when the polyethylene is cooled and hardened. As the web exits the oven, it may be taken through an optional compression nip (block 66) in order to squeeze the web for the purpose of encouraging thermal bonds and possibly to intentionally reduce the bulk of the finished product. The web is then cooled in a cooling section (block 67) in order to set the thermal bonds.

Different methods and devices for online converting may then be employed to produce the desired form of the finished product. FIG. 1 illustrates a number of possible alternatives, including an edge slitter (block 68) for trimming the edges of the web to a fixed width. Also illustrated after the edge slitter (block 68) are three converting alternatives for sheeting (block 70), festooning (block 71) or winding (block 72) the finished web.

Figure 2:
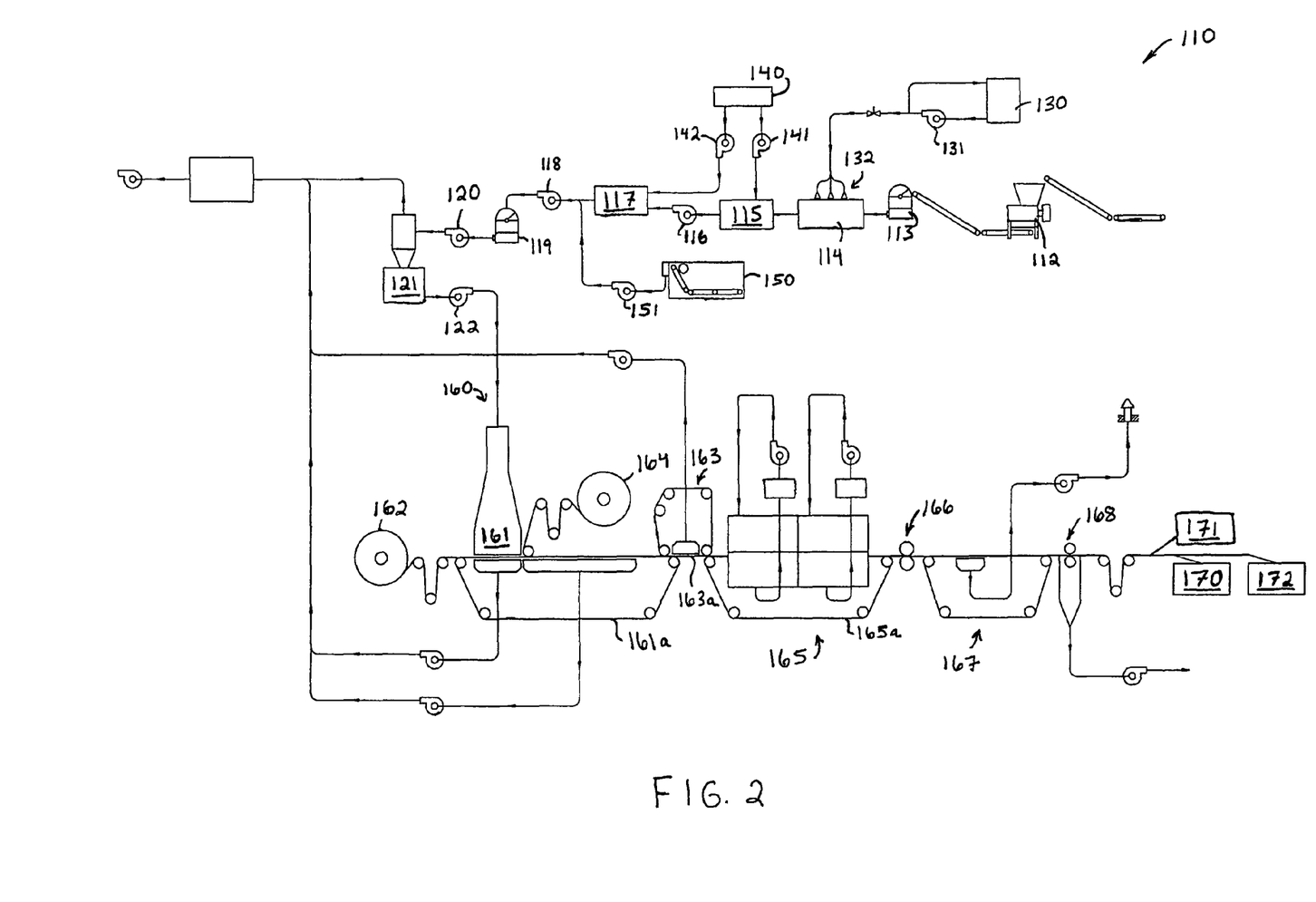
FIG. 2 is a schematic view of the manufacturing line for the process of FIG. 1.

FIG. 2 is a schematic view of the manufacturing line 110 for the process 10 shown in FIG. 1 and described above. In FIG. 2, structure of the manufacturing line 110 corresponding to a step or block in the flow chart of FIG. 1 has the same reference number in the "100" series.

In the manufacturing line 110, the cellulose obtained from one or more sources is processed through a shredder 112, which, depending on the type of shredder and the properties of the scrap or recycled cellulose, may tend to produce densified or compacted clumps of material.

Before entering a spray chamber 114, the shredded pieces of cellulose must be small enough and of low enough density to permit a sufficiently rapid absorption of sprayed liquid fire-retardant, given the desired throughput, the allowable time for absorption, and the desired level of fire-retardancy. If necessary to achieve the suitable range of sizes and densities, the clumps and pieces of cellulose exiting the shredder 112 are processed through a first hammer mill 113 which declumps and generally reduces the cellulose to sizes ranging from fines to pieces up to 3" to 4" in length. The first hammer mill 113 is optional in that some types of shredders 112 may reduce the cellulose to non-compacted pieces within a similar size range without requiring further processing.

After exiting the shredder 112 and, optionally, the first hammer mill 113, and the spray chamber 114, the processed cellulose is then pneumatically transported through a series of devices in an air stream generated by the series arrangement of three transport fans: a first transport fan 116, a second transport fan 118, and third transport fan 120. The transport fans 116, 118 and 120 provide a motive force to move the processed cellulose along the series of devices.

The cellulose is drawn by the air stream through the spray chamber 114 where it is sprayed with a liquid fire-retardant. One manner of applying fire retardant to the cellulose that may be useful in embodiments of the present invention is described in U.S. Pat. No. 5,534,301, the entire contents of which is hereby incorporated by reference.

In one independent embodiment, the liquid fire-retardant comprises water into which boric acid and ammonium sulfate have been added to just below their respective saturation levels in water at approximately 77 degrees Fahrenheit. The liquid fire-retardant is mixed in a mixing tank 130 and then supplied to spray nozzles 132 by a volumetric pump 131. The spray nozzles 132 are arranged so as to provide sufficient opportunity for cellulose passing through the spray chamber 114 to absorb the desired amount of liquid fire-retardant. Approximately 25 to 40 gallons of fire-retardant are sprayed into the spray chamber 114 for approximately every 1000 lbs. of processed cellulose.

After being sprayed with a liquid fire-retardant, the cellulose is dried by passing it through a first drying chamber 115, into which a first hot air fan 141 injects heated air generated by an air heater 140, such as a gas burner. The spray chamber 114 and the first dryer 115 are arranged so as to allow adequate time for the liquid fire-retardant to be absorbed by the cellulose prior to being subjected to heated air. The heated air injected into the first dryer 115 is limited in temperature and volume to avoid excessively rapid drying of the cellulose, which, if not avoided, may prevent adequate absorption by the cellulose of the fire-retardant chemicals.

The cellulose is then transported in the air stream into a second dryer 117. Heated air injected into the second dryer by a second hot air fan 142 from the air heater 140 is sufficient to complete the process of driving water out of the cellulose. The dried cellulose exits the second dryer 117 and enters the second transport fan 118.

Bicomponent fiber is stored in and metered at a controlled rate from a reserve hopper 150 into a fiber supply fan 151, which introduces the bicomponent fiber into the inlet of the second transport fan 118. The fire-retardant treated cellulose along with the bicomponent fiber is then transported to a second hammer mill 119, in which the cellulose is further reduced in size and mixed with the bicomponent fiber. The mixture of bicomponent fiber and cellulose (the web material) is then carried through the third transport fan 120 to a storage bin 121.

The storage bin 121 is equipped with a metering mechanism (not shown in detail) by which processed web material can be fed at a controlled rate into a fourth transport air fan 122, which carries the material to the forming head chute or reserve section 160. The reserve section 160, situated on top of the forming head 161, meters web material at a controlled rate into the forming head 161.

The forming head 161 disperses and deposits the web material over a defined area of the advancing forming belt 161a to gradually form the pre-bonded web. A forming head 161 suitable for use in making the web is described in U.S. Patent Publication No. 2007/0124894, as mentioned above If included in the embodiment, a bottom layer of scrim is unwound from a first unwinder 162 and carried under the forming head 161 on top of the forming belt 161a. The web is then formed on top of the bottom scrim.

If included in the embodiment, a layer of netting is unwound from the first unwinder 162 and carried under the forming head 161, and, for some distance while under the forming head 161, above the forming belt 161a. Some amount of web material thereby falls through the netting, causing the netting to become to some extent embedded within the web.

If included in the embodiment, a top layer of scrim is unwound from a second unwinder 164 and carried on top of the web either while the web is still on the forming belt after the forming head 161, or while the web transitions from the forming belt 161*a* to a transfer belt 163*a*.

A transfer section 163 includes structure for transferring the web from the forming belt 161*a* to an oven belt 165*a*. Such structure may include a belt, such as the transfer belt 163*a*, a conveyor, other transport structure, etc.

The web is conveyed from the transfer section 163 to an oven 165, where it is heated sufficiently to cause the melting or softening of the polyethylene in the individuated bicomponent fibers, and, if provided, in the scrim layer(s). Molten or softened polyethylene in contact with other fibers or particles of cellulose in the web may create bonds when the polyethylene is cooled and hardened. As the web exits the oven 165, it may be taken through an optional compression nip 166 in order to squeeze the web for the purpose of encouraging thermal bonds and possibly to intentionally reduce the bulk of the finished product. The web is then cooled in a cooling section 167 in order to set the thermal bonds.

Different methods and devices for online converting may then be employed to produce the desired form of the finished product. FIG. 2 illustrates a number of possible alternatives, including an edge slitter or trimmer 168 for trimming the edges of the web to a fixed width. After the edge slitter 168, converting alternatives are provided for sheeting 170, festooning 171 or winding 172 the finished web.

Figure 3:
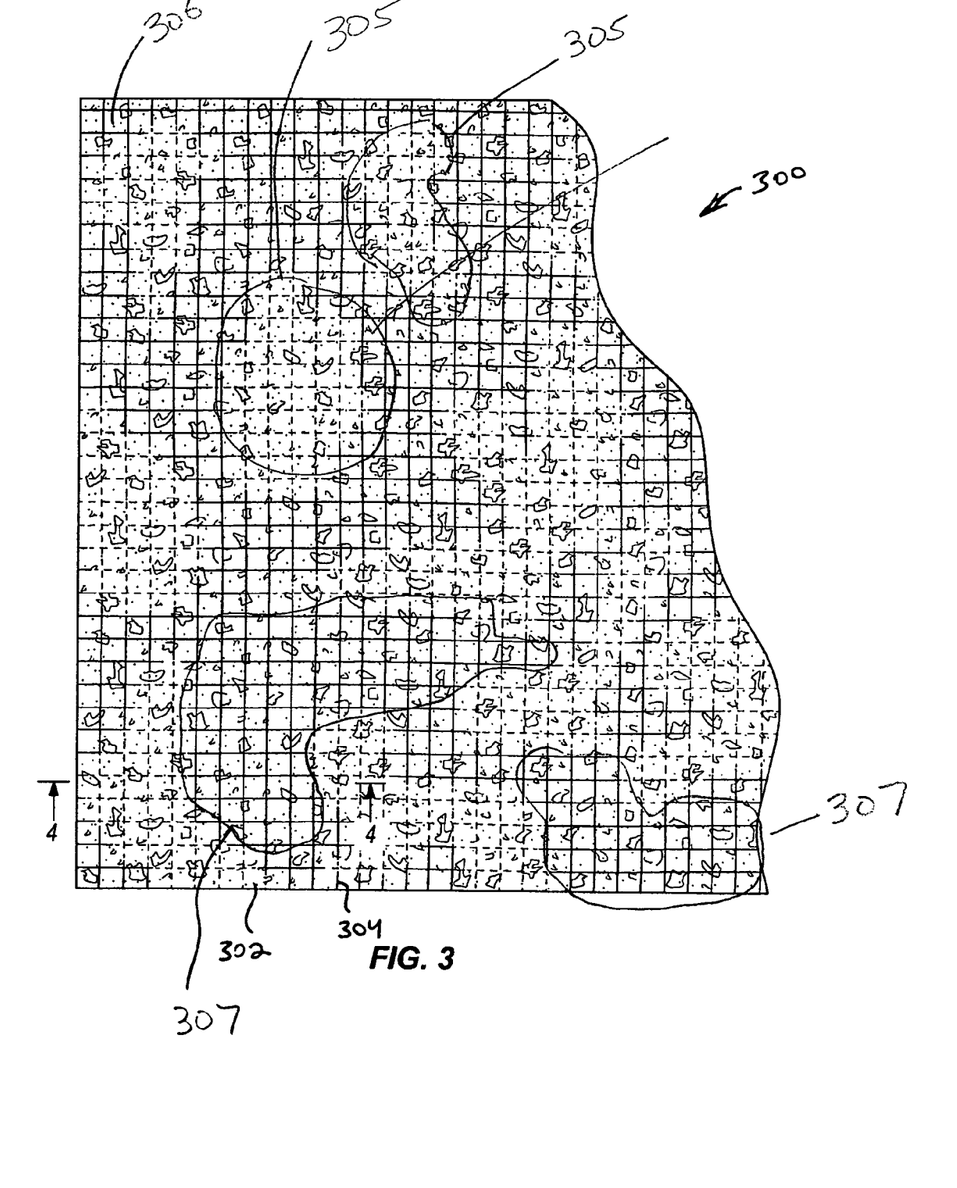
FIG. 3 is a bottom view of a web with netting made by the process in FIG. 1.
Figure 4:
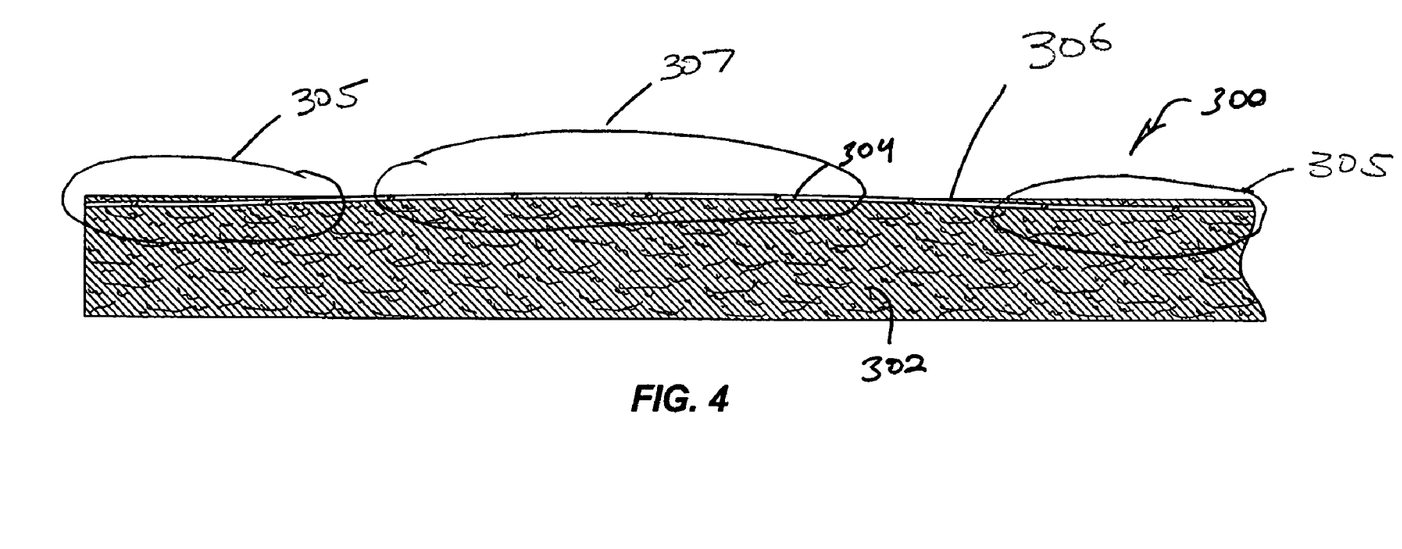
FIG. 4 is a cross-sectional view of the pad of FIG. 3, taken along line 4-4 of the insulating web of FIG. 3.

FIGS. 3 and 4 show a pad 300, such as an absorbent, filter, insulator, etc., that includes a quantity of cellulose and bicomponent fiber 302 and netting 304. As mentioned above, step 62 includes providing the optional bottom netting. The netting 304 is unrolled from the unwinder 162 and held above the forming belt 161*a* for a distance (see FIG. 2), such that some of the cellulose and bicomponent fiber 302 fall through the netting 304. The netting 304 is then lowered onto the forming belt 161*a* and onto any cellulose and bicomponent fiber 302 that has fallen through the netting 304. The netting 304 is at least partially embedded in the web material, as shown in FIGS. 3 and 4. For example, in the embodiment shown in FIG. 3, the pad 300 includes multiple areas 305 where the netting 304 is visible on a top surface 306 of the pad. The pad 300 also includes multiple areas 307 where the netting 304 is not visible on the top surface 306 (as is shown by phantom lines). In other constructions, the nettings 304 can be more or less embedded in the web material, depending upon, among other things, the size of netting 304 used and the average particle size of the cellulose and bicomponent fiber 302.

The pad 300 is directed through the oven 165, as described above. The individuated bicomponent fibers 302 melt in the oven 165 and bond with the cellulose fibers. In the illustrated construction, the netting 304 does not have any adhesive properties, nor does the illustrated netting 304 melt in the oven 165. Rather, the netting 304 is secured to the pad 300 because the netting 304 is at least partially embedded in the web material. Some of the cellulose and bicomponent fiber 302 is positioned on opposite sides of the netting 304 when the pad 300 is sent through the oven 165 and the web material forms bonds around the netting 304. A nip roller 166 can be used to compress the pad 300, and further secure the netting 304 to the cellulose and bicomponent fibers 302. The netting 304 increases the strength of the pad 300, without decreasing or substantially decreasing the absorbency and/or insulation properties of the pad 300.

In another construction (not shown), the netting 304 may be fully embedded into the pad 300, such that the netting 304 is not visible through the cellulose and bicomponent fiber 302. In yet another construction (not shown), netting 304 may be included on both a top and a bottom of the pad 300. Further, in another construction (not shown), the netting 304 may have adhesive properties and/or may soften or melt when the pad 300 is sent through the oven 165 to at least partially bond with the web material.

Figure 5:
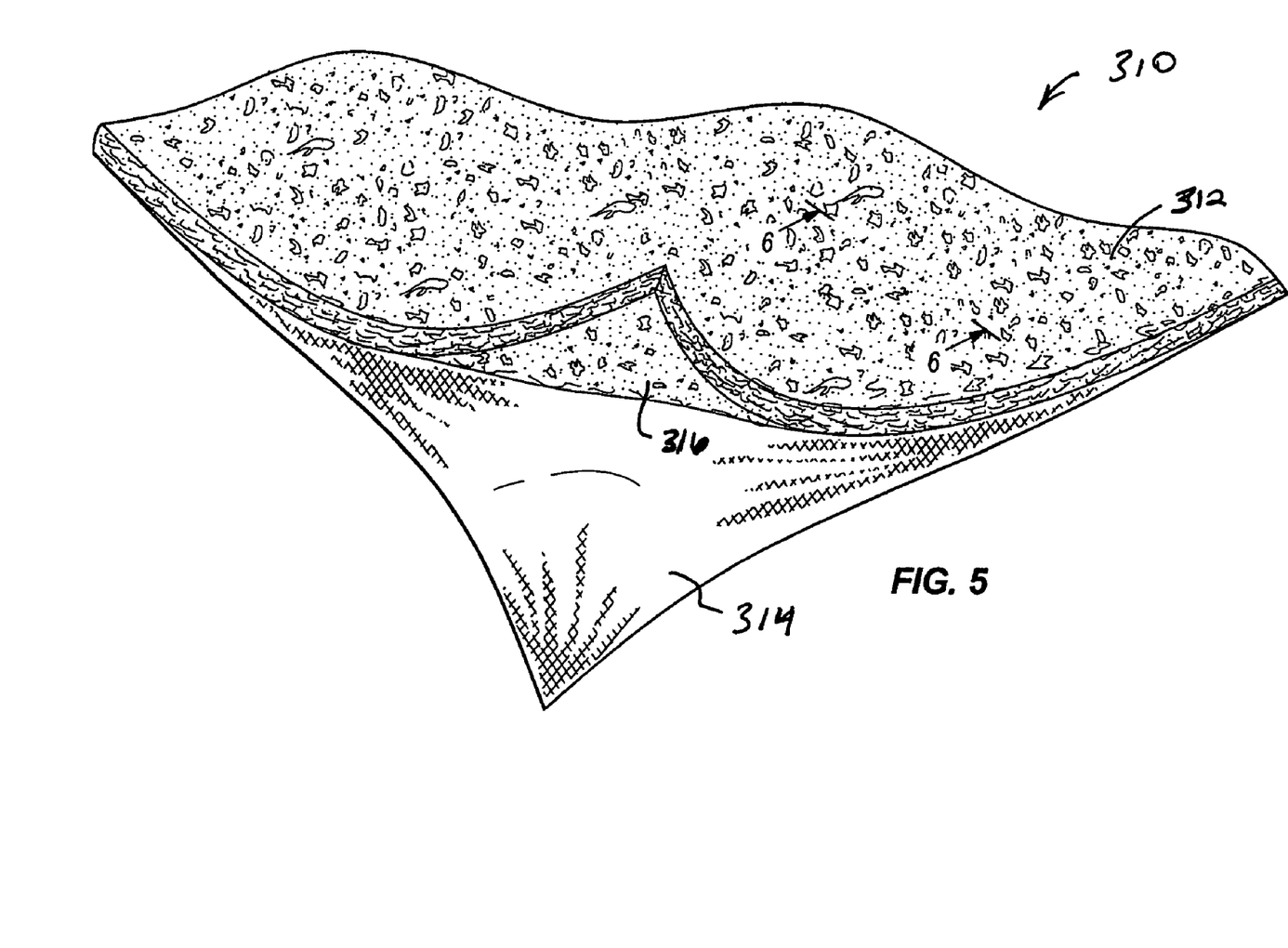
FIG. 5 is a perspective view of a web with a scrim made by the process in FIG. 1.
Figure 6:
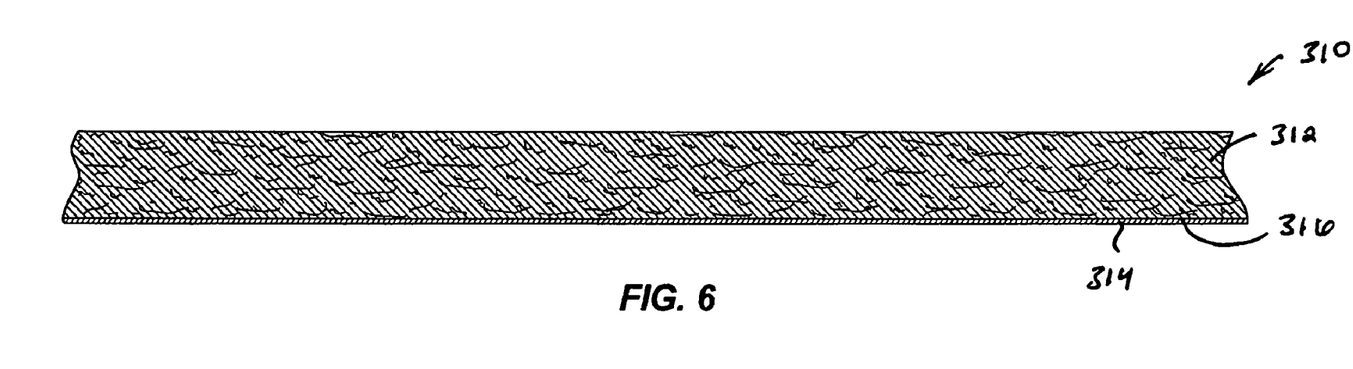
FIG. 6 is a cross-sectional view of the pad of FIG. 5, taken along line 6-6 of FIG. 5.

FIGS. 5 and 6 show a pad 310 that includes a quantity of cellulose and bicomponent fiber 312 and a scrim 314. The scrim 314 is secured to a surface 316 of the pad 310. The scrim 314 can be positioned under the cellulose and bicomponent fiber 312, such as in step 62, or can be positioned above the cellulose and bicomponent fiber 312, such as in step 64. When only one scrim 314 is used, it may be desirable to position the scrim 314 below the cellulose and bicomponent fiber 312, to ease movement along the forming belt 161*a*.

When the pad 310 is directed through the oven 165, the bicomponent fibers 312 can also partially melt and adhere to the scrim 314, to secure the scrim 314 to the pad 310. In another construction, the scrim 314 can at least partially melt in the oven 165. In some constructions, the scrim 314 can be pressed against the pad 310 by nip roller 166. The scrim 314 increases the strength of the pad 310 without decreasing or substantially decreasing the absorbent and insulating properties of the pad 310.

Figure 7:
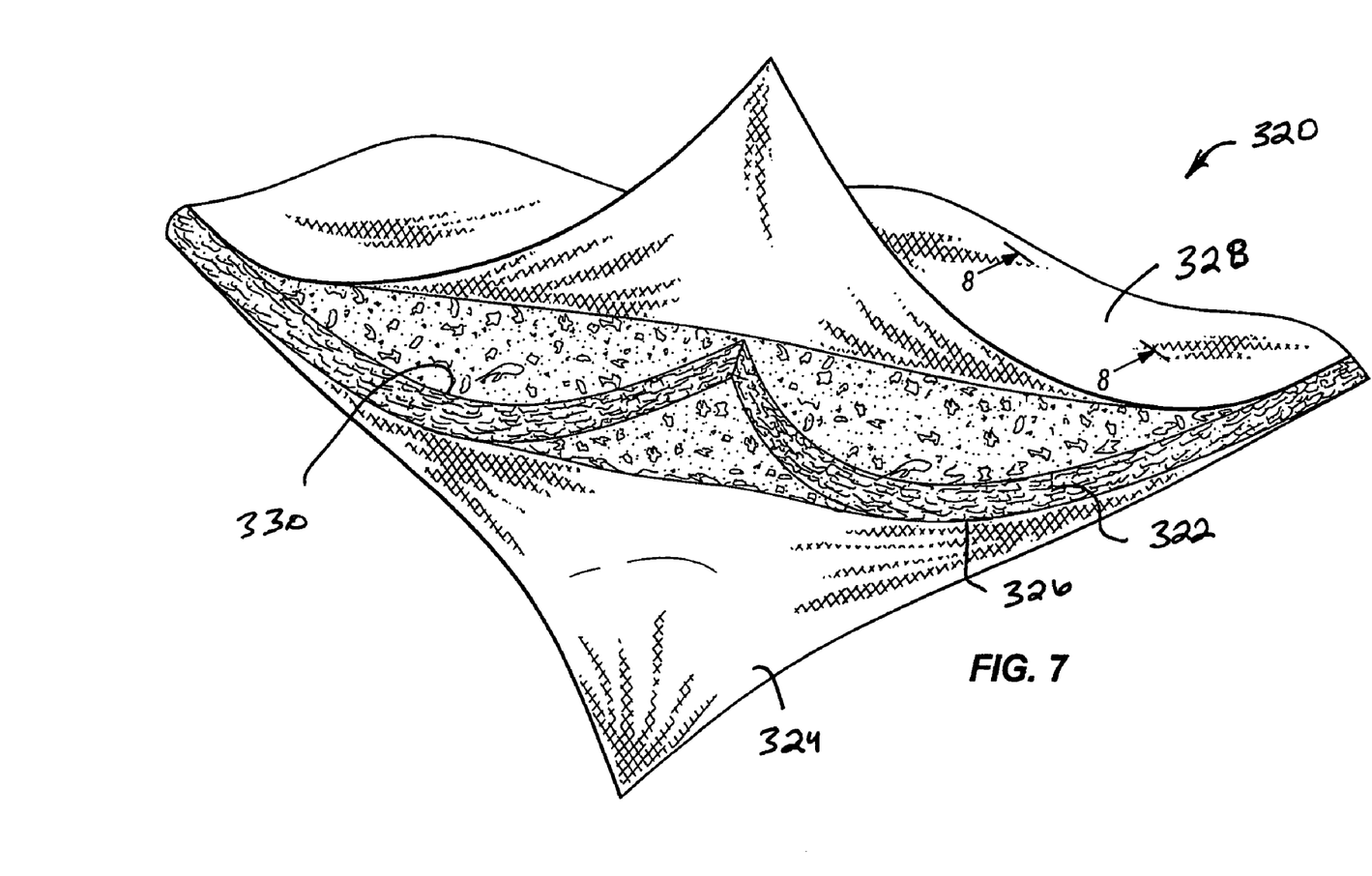
FIG. 7 is a perspective view of a web with two scrims made by the process in FIG. 1.
Figure 8:
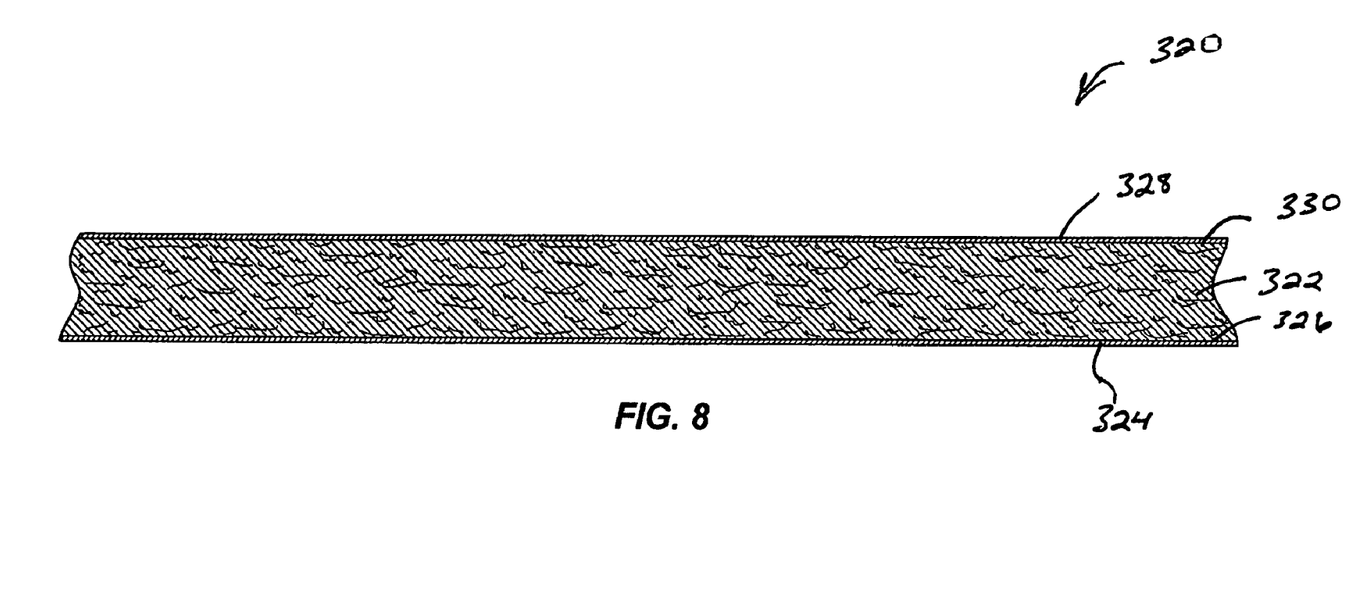
FIG. 8 is a cross-sectional view of the pad of FIG. 7, taken along line 8-8 of FIG. 7.

FIGS. 7 and 8 show a pad 320 that includes a quantity of cellulose and bicomponent fiber 322, a first scrim 324, positioned on a first pad surface 326, and a second scrim 328, positioned on a second pad surface 330. The first scrim 324 can be applied to the pad 320 in a similar way as the scrim 314 is applied to the pad 310. The second scrim 328 is positioned on the second pad surface 328 after the cellulose and bicomponent fiber 322 is positioned on the first scrim 324, such as at step 64.

The first and second scrims 324, 328 are bonded to the pad 320 when the pad 320 is moved through the oven 165. The melting bicomponent fibers 322 also adhere to the scrims 324, 328 and form a bond when cooled. As discussed above, the nip roller 166 can press the pad 320 to further bond the scrims 324, 328 to the cellulose and bicomponent fiber 322. The scrims 324, 328 increase the strength of the pad 320 without significantly decreasing the absorbent and insulating properties of the pad 320.

Figure 9:
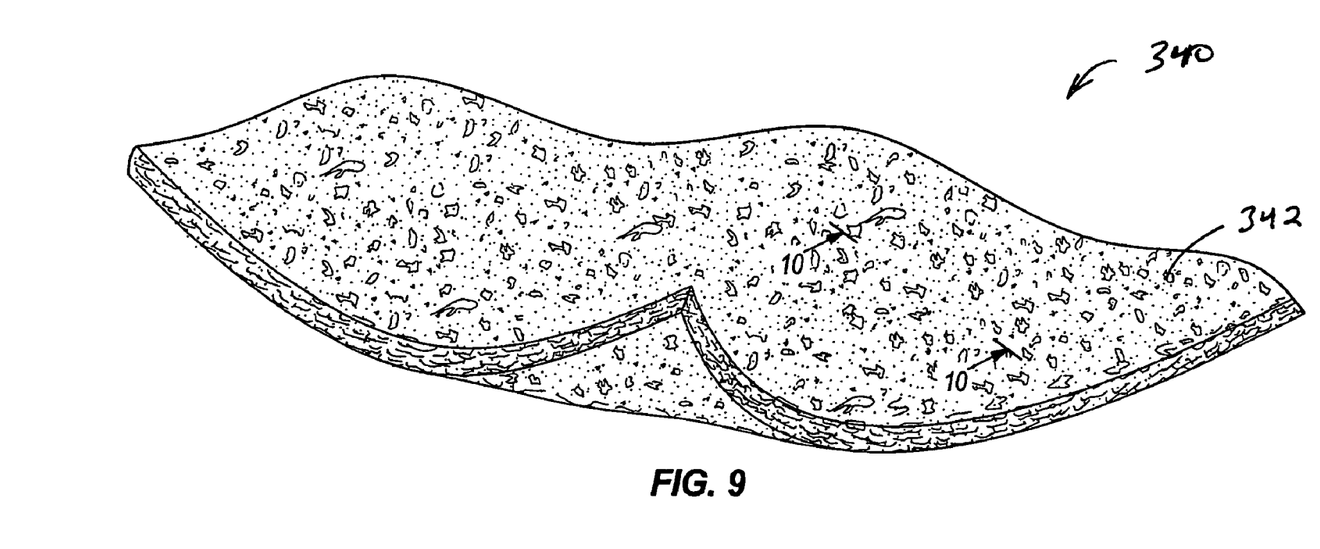
FIG. 9 is a perspective view of another web made by the process in FIG. 1.
Figure 10:
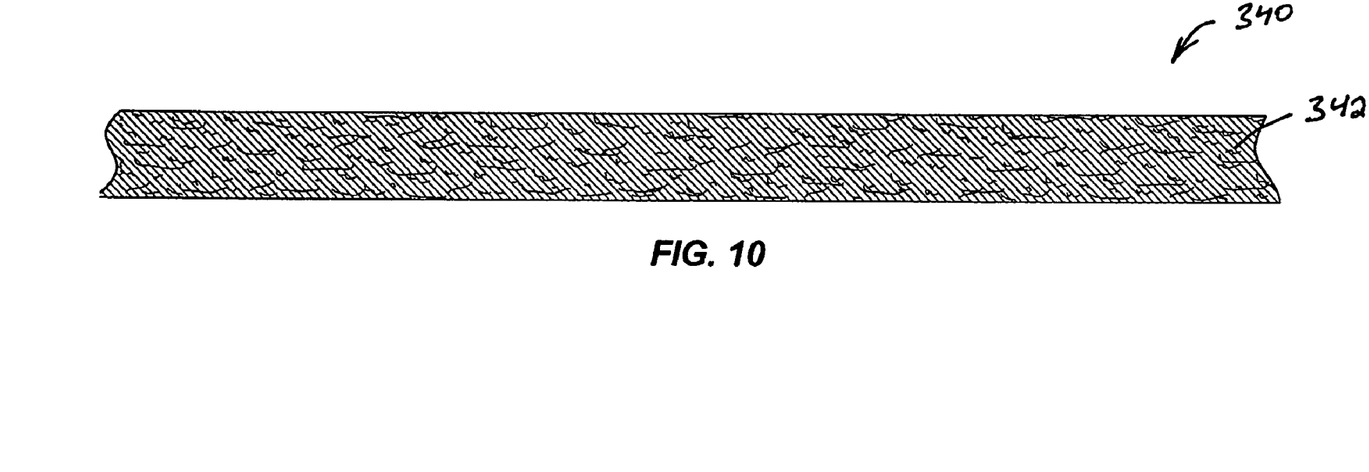
FIG. 10 is a cross-sectional view of the pad of FIG. 9, taken along line 10-10 of FIG. 9.

FIGS. 9 and 10 illustrate a pad 340 that includes a quantity of cellulose and bicomponent fiber 342. In the illustrated construction, the pad 340 does not include netting or scrim(s). The pad 340 is sent through the oven 165, to create a bond between the cellulose and bicomponent fiber 342. The pad 340 is optionally sent through the nip roll 166 to at least partially compress the pad 340. It may be desirable to utilize pad 340 for thermal or acoustic insulating, because the pad 340 will not necessarily be as strong as other similar pads that include netting or scrim. The pad 340 can be utilized as an absorbent, especially if a higher percentage of bicomponent fiber 342 is utilized, to create firmer bonding between the cellulose and bicomponent fiber 342.

In one embodiment, the cellulose (as processed in the manner described above) is not formed into a web. Instead, the loose material is accumulated from the forming head and placed in containers. The loose material may be used as an absorbent or insulator. For example, the loose cellulose may be blown into spaces of a building as an insulator or sprinkled on a spill. After being placed on a spill, the loose cellulose is swept, vacuumed, or otherwise collected for disposal. The loose material may also be places or stuffed into a cotton or synthetic tube or sock. The sock can have a diameter as small as a one or two inches or a great as a one or two feet or more. The socks may be placed around a perimeter of an area to help contain a spill. The loose material can include the cellulose and bicomponent fiber, but bicomponent fiber is not necessary when the material is used in the manner described in this paragraph.

As should be apparent from the above, embodiments of the invention provide, among other things, fire-retarded webs for use as absorbents or insulators, and methods of manufacturing the same. One or more independent features, independent advantages, and independent embodiments of the invention are set forth in the following claims:

What is claimed is:

1. An industrial absorbent comprising:
    a non-woven web including
        cellulose particles formed from shredded, declumped, and sized recycled paper, the recycled paper being selected from at least one of a group of sources including a source of post-industrial paper and a source of post-consumer paper,
        opened, individuated bicomponent fibers mixed with the cellulose particles, at least some of the bicomponent fibers being thermally bonded to at least some of the cellulose particles to form the non-woven web, and
        at least one of the group of 1) an air-permeable layer of thermoplastic scrim, thermally bonded to an outer surface of the non-woven web and 2) a layer of netting attached to the non-woven web by being at least partially embedded within the non-woven web;
    wherein the cellulose particles are treated with a liquid fire-retardant and dried before being mixed with the bicomponent fibers;
    wherein the non-woven web has a bulk-to-weight ratio of about 20 to about 30 mils/osy; and
    wherein the non-woven web has a weight and an absorbency of about 11 to about 15 times the weight of the web.

2. The product as claimed in claim 1, wherein an amount of bicomponent fiber included in the non-woven web is between 8% and 12% of a total web weight.

3. The product as claimed in claim 1, wherein the non-woven web has an outer surface, and wherein the product further comprises an air-permeable layer of thermoplastic scrim, thermally bonded to the outer surface of the non-woven web.

4. The product as claimed in claim 1, and further comprising a layer of netting attached to the non-woven web by being at least partially embedded within the non-woven web.

5. The product as claimed in claim 1, wherein the fire retardant includes a liquid fire-retardant comprised of a mixture of water, boric acid and ammonium sulfate.

6. An non-woven product comprising:
    a sock stuffed with shredded, declumped, and sized recycled cellulose particles, the particles formed from at least one of a group of sources including a source of post-industrial paper and a source of post-consumer paper, the cellulose particles being treated with a liquid fire-retardant and then being dried before placement in the sock.

7. The non-woven product as claimed in claim 6, wherein the fire-retardant includes a liquid fire-retardant comprised of a mixture of water, boric acid and ammonium sulfate.

8. A fire-retardant industrial absorbent comprising:
    A non-woven web formed form a plurality of recycled cellulose particles and a plurality of binder fibers; wherein a liquid fire-retardant is applied to the paper particles before the non-woven web is formed.

9. The fire-retardant industrial absorbent of claim 8 wherein the liquid fire-retardant is comprised of a mixture of water, boric acid and ammonium sulfate.

10. The fire-retardant industrial absorbent of claim 8, wherein the binder fibers make up between 8% and 12% of a total web weight of the non-woven web.

11. The fire-retardant industrial absorbent of claim 8, wherein the non-woven web has a bulk-to-weight ratio of about 20 to about 30 mils/osy.

12. The fire-retardant industrial absorbent of claim 8, wherein the non-woven web has a weight and an absorbency of about 11 to about 15 times the weight of the non-woven web.

13. The fire-retardant industrial absorbent of claim 8, further comprising an air-permeable layer of thermoplastic scrim thermally bonded to an outer surface of the non-woven web.

14. The fire-retardant industrial absorbent of claim 8, further comprising a net attached to the non-woven web by being at least partially embedded within the non-woven web.

15. The fire-retardant industrial absorbent of claim 8, wherein the recycled cellulose particles are sourced from at least one of a group of sources including a source of post-industrial paper and a source of post-consumer paper.

16. The fire-retardant industrial absorbent of claim 8, wherein the cellulose particles are dried before the non-woven web is formed.

17. The fire-retardant industrial absorbent of claim 16 wherein the liquid fire-retardant is comprised of a mixture of water, boric acid and ammonium sulfate.

18. The fire-retardant industrial absorbent of claim 17, wherein the binder fibers make up between 8% and 12% of a total web weight of the non-woven web.

19. The fire-retardant industrial absorbent of claim 18, further comprising one of an air-permeable layer of thermoplastic scrim thermally bonded to an outer surface of the non-woven web and a net attached to the non-woven web by being at least partially embedded within the non-woven web;
    wherein the non-woven web has a bulk-to-weight ratio of about 20 to about 30 mils/osy; and
    wherein the non-woven web has a weight and an absorbency of about 11 to about 15 times the weight of the web.

20. The fire-retardant industrial absorbent of claim 19, wherein the recycled cellulose particles are sourced from at least one of a group of sources including a source of post-industrial paper and a source of post-consumer paper.

* * * * *